United States Patent Office 3,372,193
Patented Mar. 5, 1968

3,372,193
1,1-DIARYL-2-METHYL-3-(BENZYLIDENE-
AMINO)PROPAN-(1)-OLS
Robert B. Moffett, Kalamazoo, Mich., assignor to The
Upjohn Company, Kalamazoo, Mich., a corporation of
Delaware
No Drawing. Filed June 1, 1966, Ser. No. 554,304
2 Claims. (Cl. 260—566)

This invention relates to new and useful chemical compounds and more particularly to 1,1-diphenyl-2-methyl-3-(benzylideneamino)propanols having the formula:

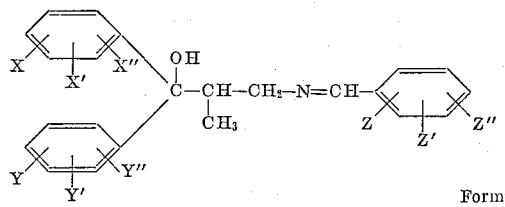

Formula I wherein X, X', X", Y, Y', Y", Z, Z', and Z" are members selected from the group consisting of hydrogen; alkyl containing from 1 to 4 carbon atoms, inclusive; alkoxy containing from 1 to 4 carbon atoms, inclusive; and halogen.

Examples of alkyl are methyl, ethyl, propyl and butyl, including isomeric forms thereof. Examples of alkoxy are methoxy, ethoxy, propoxy, and butoxy, including isomeric forms thereof. The term "halogen" is inclusive of fluorine, chlorine, bromine, and iodine.

The compounds of Formula I above have the same pharmacological activity and can be used for the same purposes as the compounds of Formula II below from which they are derived, e.g., the pharmacological activity is primarily upon the central nervous system and produces stimulation of psychomotor activity, depression of inhibitory mechanisms, suppression of appetite, tranquilization, and diminution of CNS originating muscle spasms.

The utility of compounds of Formula II below is more fully disclosed in Union of South Africa patent application No. 65/4,127.

Although the compounds of Formula I have the same pharmacological activities as the compounds of Formula II, the compounds of Formula I unexpectedly produce pharmacological effects of longer duration by producing more prolonged blood levels of the compound.

The compounds of Formula I can be prepared by reacting a 1,1-diphenyl-2-methyl-3-aminopropanol of Formula II with a benzaldehyde of Formula III, in accordance with the equation:

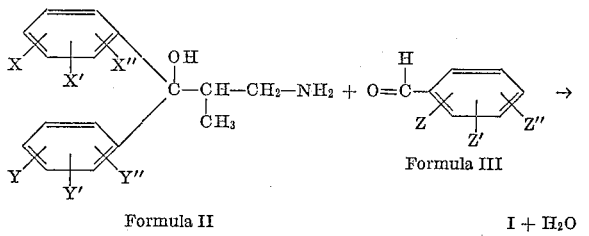

wherein X, X', X", Y, Y', Y", Z, Z', and Z" are as given above.

The Formula II primary amine (unsubstituted or having benzene ring substitution) is reacted with the Formula III benzaldehyde (substituted or unsubstituted) in accordance with procedures known in the art for the preparation of Schiff bases. Illustratively, the reaction is carried out in the presence of a water-immiscible, inert solvent such as benzene, toluene, xylene and the like, at the boiling point of the reaction mixture and azeotropically removing the water formed during the reaction. The reactants can be employed in substantially equimolar amounts or an excess of either reactant can be employed if so desired; ordinarily, it is neither necessary nor desirable to employ more than about a 25% excess of a reactant.

Upon completion of the reaction, the benzylideneamino compound of Formula I can be isolated and purified by conventional methods, for example, by evaporating the mixture to dryness and crystallizing the residue from a solvent such as methanol, ethanol, 1-propanol, 2-propanol, acetone, ethyl acetate and the like, or by chromatography, fractional crystallization, or combinations of such methods.

The 1,1-diphenyl-2-methyl-3-aminopropanols (Formula II above) can be prepared in accordance with the following reaction scheme, employing benzophenones (Formula IV below) as starting materials:

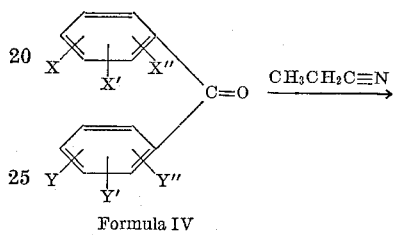

Formula IV

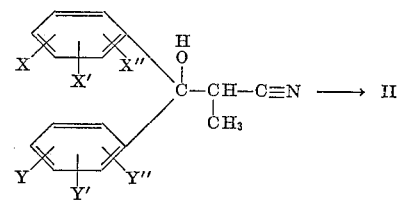

Formula V wherein X, X', X", Y, Y', and Y" are as given above.

The benzophenone compound of Formula IV is reacted with propionitrile in the presence of an alkaline condensing agent such as potassium hydroxide, lithium amide, sodium amide, butyl-lithium, diethylaminolithium, and the like, in an anhydrous solvent system, e.g., diethyl ether, to prepare a 1,1-diphenyl-2-cyanopropanol of Formula V. The 1,1-diphenyl-2-cyanopropanol is reduced to the corresponding primary amine of Formula II with lithium aluminum hydride in an anhydrous solvent system, e.g., diethyl ether, or by catalytic hydrogenation, e.g., in the presence of Raney nickel catalyst.

The synthesis of 1,1-diphenyl-2-methyl-3-aminopropanols of Formula II is illustrated below in the preparations.

PREPARATION 1

*1,1-diphenyl-2-cyanopropanol*

A solution of 500 gm. (2.75 moles) of benzophenone and 330 ml. (6.0 moles) of propionitrile in 2000 ml. of dry diethyl ether was added slowly to a suspension of 113.5 gm. of sodium amide (2.9 moles) in 1150 ml. of dry diethyl ether. After stirring and refluxing the mixture for three hours, it was slowly poured into 6 liters of ice water with stirring. The layers were separated and the water layer was extracted with two 1-liter portions of diethyl ether. All the ether layers and extracts were combined and washed successively with water, 5% hydrochloric acid, water, and saturated sodium chloride solution. The washed ether solution was dried over anhydrous sodium sulfate, the sodium sulfate was filtered off, and the ether was removed by evaporation, leaving 1,1-diphenyl-2-cyanopropanol as white crystals. The 1,1-diphenyl-2-cyanopropanol, after recrystallization from a 50:50 by volume mixture of benzene and Skellysolve B (mixture of hexanes), had a melting point of 124.7 to 125.2° C.

Substituting each of the following substituted benzophenones:

2,2'-dibromobenzophenone,
3,3'-dibromobenzophenone,
2-chlorobenzophenone,
4,4'-dichlorobenzophenone,
2,2'-diiodobenzophenone,
4-fluorobenzophenone,
3-iodobenzophenone,
2-methylbenzophenone,
3-bromo-4-methylbenzophenone,
2-bromo-4'-methylbenzophenone,
4-bromo-4'-ethoxybenzophenone,
2-methoxy-5-methyl-2'-bromobenzophenone,
4-propylbenzophenone,
2,4,5-trimethylbenzophenone,
4,4'-dimethoxybenzophenone,
4-propoxybenzophenone,
2,4,5-trimethoxybenzophenone,
2,4,2',4'-tetramethoxybenzophenone,
3,4,3',4'-tetramethoxybenzophenone,
2,4,5,2',4',5'-hexamethylbenzophenone,
2,4,6,3',4',5'-hexamethoxybenzophenone,
3-fluorobenzophenone,
4,4'-difluorobenzophenone,
and 3,3'-difluorobenzophenone for the benzophenone of Preparation 1 there can be respectively obtained:

1,1-bis(2-bromophenyl)-2-cyanopropanol,
1,1-bis(3-bromophenyl)-2-cyanopropanol,
1-phenyl-1-(2-chlorophenyl)-2-cyanopropanol,
1,1-bis(4-chlorophenyl)-2-cyanopropanol,
1,1-bis(2-iodophenyl)-2-cyanopropanol,
1-phenyl-1-(4-fluorophenyl)-2-cyanopropanol,
1-phenyl-1-(3-iodophenyl)-2-cyanopropanol,
1-phenyl-1-(2-methylphenyl)-2-cyanopropanol,
1-phenyl-1-(3-bromo-4-methylphenyl)-2-cyanopropanol,
1-(2-bromophenyl)-1-(4-methylphenyl)-2-cyanopropanol,
1-(4-bromophenyl)-1-(4-ethoxyphenyl)-2-cyanopropanol,
1-(2-methoxy-5-methylphenyl)-1-(2-bromophenyl)-2-cyanopropanol,
1-phenyl-1-(4-propylphenyl)-2-cyanopropanol,
1-phenyl-1-(2,4,5-trimethylphenyl)-2-cyanopropanol,
1,1-bis(4-methoxyphenyl)-2-cyanopropanol,
1-phenyl-1-(4-propoxyphenyl)-2-cyanopropanol,
1-phenyl-1-(2,4,5-trimethoxyphenyl)-2-cyanopropanol,
1,1-bis(2,4-dimethoxyphenyl)-2-cyanopropanol,
1,1-bis(3,4-dimethoxyphenyl)-2-cyanopropanol,
1,1-bis(2,4,5-trimethoxyphenyl)-2-cyanopropanol,
1-(2,4,6-trimethoxyphenyl)-1-(3,4,5-trimethoxyphenyl)-2-cyanopropanol,
1-phenyl-1-(3-fluorophenyl)-2-cyanopropanol,
1,1-bis(4-fluorophenyl)-2-cyanopropanol,
and 1,1-bis(3-fluorophenyl)-2-cyanopropanol.

PREPARATION 2

*1,1-diphenyl-2-methyl-3-aminopropanol*

A solution of 119 gm. (0.5 mole) of 1,1-diphenyl-2-cyanopropanol in 2 liters of anhydrous diethyl ether was added rapidly to 28.4 gm. (0.75 mole) of lithium aluminum hydride in 200 ml. of anhydrous diethyl ether. The mixture was stirred at the reflux temperature for 4 hours, and then was decomposed by the successive addition of 28 ml. of water, 28 gm. of 20% aqueous sodium hydroxide solution, and 85 ml. of water. The mixture was filtered and the filter cake was extracted with diethyl ether. The filtrate and extract were combined and dried, and the dried solution was evaporated to dryness in a rotating evaporator. The 114.5 gm. of white crystals thus obtained were dissolved in 5% hydrochloric acid and the solution was extracted with diethyl ether. The aqueous layer was basified with 20% aqueous sodium hydroxide solution and the mixture was extracted several times with diethyl ether. The combined ether extracts were washed successively with water and saturated sodium chloride solution, and dried. The solution was evaporated to dryness, leaving 114.5 gm. (95% of theory) of 1,1-diphenyl-2-methyl-3-aminopropanol. Recrystallization from isopropyl alcohol gave 59.5 gm. of this compound in the form of white crystals having a melting point of 123 to 124° C.

*Analysis.*—Calcd. for $C_{16}H_{19}NO$: C, 79.63; H, 7.94; N, 5.80. Found: C, 79.44; H, 8.23; N, 5.95.

Substituting each of the following ring-substituted 1,1-diphenyl-2-cyanopropanols:

1,1-bis(2-bromophenyl)-2-cyanopropanol,
1,1-bis(3-bromophenyl)-2-cyanopropanol,
1-phenyl-1-(2-chlorophenyl)-2-cyanopropanol,
1,1-bis(4-chlorophenyl)-2-cyanopropanol,
1,1-bis(2-iodophenyl)-2-cyanopropanol,
1-phenyl-1-(4-fluorophenyl)-2-cyanopropanol,
1-phenyl-1-(3-iodophenyl)-2-cyanopropanol,
1-phenyl-1-(2-methylphenyl)-2-cyanopropanol,
1-phenyl-1-(3-bromo-4-methylphenyl)-2-cyanopropanol,
1-(2-bromophenyl)-1-(4-methylphenyl)-2-cyanopropanol,
1-(4-bromophenyl)-1-(4-ethoxyphenyl)-2-cyanopropanol,
1-(2-methoxy-5-methylphenyl)-1-(2-bromophenyl)-2-cyanopropanol,
1-phenyl-1-(4-propylphenyl)-2-cyanopropanol,
1-phenyl-1-(2,4,5-trimethylphenyl)-2-cyanopropanol,
1,1-bis(4-methoxyphenyl)-2-cyanopropanol,
1-phenyl-1-(4-propoxyphenyl)-2-cyanopropanol,
1-phenyl-1-(2,4,5-trimethoxyphenyl)-2-cyanopropanol,
1,1-bis(2,4-dimethoxyphenyl)-2-cyanopropanol,
1,1-bis(3,4-dimethoxyphenyl)-2-cyanopropanol,
1,1-bis(2,4,5-trimethoxyphenyl)-2-cyanopropanol,
1-(2,4,6-trimethoxyphenyl)-1-(3,4,5-trimethoxyphenyl)-2-cyanopropanol,
1-phenyl-1-(3-fluorophenyl)-2-cyanopropanol,
1,1-bis(4-fluorophenyl)-2-cyanopropanol,
and 1,1-bis(3-fluorophenyl)-2-cyanopropanol for the unsubstituted 1,1-diphenyl - 2 - cyanopropanol of Preparation 2 there can be respectively obtained:

1,1-bis(2-bromophenyl)-2-methyl-3-aminopropanol,
1,1-bis(3-bromophenyl)-2-methyl-3-aminopropanol,
1-phenyl-1-(2-chlorophenyl)-2-methyl-3-aminopropanol,
1,1-bis(4-chlorophenyl)-2-methyl-3-aminopropanol,
1,1-bis(2-iodophenyl)-2-methyl-3-aminopropanol,
1-phenyl-1-(4-fluorophenyl)-2-methyl-3-aminopropanol,
1-phenyl-1-(3-iodophenyl)-2-methyl-3-aminopropanol,
1-phenyl-1-(2-methylphenyl)-2-methyl-3-aminopropanol,
1-phenyl-1-(3-bromo-4-methylphenyl)-2-methyl-3-aminopropanol,
1-(2-bromophenyl)-1-(4-methylphenyl)-2-methyl-3-aminopropanol,
1-(4-bromophenyl)-1-(4-ethoxyphenyl)-2-methyl-3-aminopropanol,
1-(2-methoxy-5-methylphenyl)-1-(2-bromophenyl)-2-methyl-3-aminopropanol,
1-phenyl-1-(4-propylphenyl)-2-methyl-3-aminopropanol,
1-phenyl-1-(2,4,5-trimethylphenyl)-2-methyl-3-aminopropanol,
1,1-bis(4-methoxyphenyl)-2-methyl-3-aminopropanol,
1-phenyl-1-(4-propoxyphenyl)-2-methyl-3-aminopropanol,
1-phenyl-1-(2,4,5-trimethoxyphenyl)-2-methyl-3-aminopropanol, 1,1-bis(2,4-dimethoxyphenyl)-2-methyl-3-aminopropanol,
1,1-bis(3,4-dimethoxyphenyl)-2-methyl-3-aminopropanol,
1,1-bis(2,4,5-trimethoxyphenyl)-2-methyl-3-aminopropanol,
1-(2,4,6-trimethoxyphenyl)-1-(3,4,5-trimethoxyphenyl)-2-methyl-3-aminopropanol,
1-phenyl-1-(3-fluorophenyl)-2-methyl-3-aminopropanol,
1,1-bis(4-fluorophenyl)-2-methyl-3-aminopropanol,
and 1,1-bis(3-fluorophenyl)-2-methyl-3-aminopropanol.

PREPARATION 3

*1,1-bis(3-chlorophenyl) - 2-methyl-3-aminopropanol and hydrochloride thereof*

A solution of 4.75 gm. (0.065 mole) of diethylamine in 20 ml. of anhydrous diethyl ether was slowly added (under nitrogen) to a solution prepared by diluting 37 ml. of 15% butyllithium in hexane (0.059 mole of butyllithium) with 50 ml. of anhydrous diethyl ether. After stirring the mixture for 25 minutes, a slurry of 12.5 gm. (0.05 mole) of 3,3'-dichlorobenzophenone and 3.3 ml. (0.059 mole) of propionitrile in 150 ml. of anhydrous diethyl ether was slowly added. The mixture was stirred under reflux overnight. After cooling, the mixture was poured into ice water and the layers were separated. The aqueous layer was extracted with diethyl ether. The combined extract and original ether layer was washed successively with water, dilute hydrochloric acid, water, and saturated sodium chloride solution, and dried over anhydrous sodium sulfate. The ethereal solution was filtered and evaporated, giving crude 1,1-bis(3-chlorophenyl)-2-cyanopropanol as a viscous oil.

The oil was dissolved in 150 ml. of anhydrous diethyl ether and the solution was slowly added to a mixture of 5.7 gm. (0.15 mole) of lithium aluminum hydride and 75 ml. of anhydrous diethyl ether. After refluxing the mixture for 24 hours, there was added 6 ml. of water followed by a solution of 0.9 gm. of sodium hydroxide in 25 ml. of water. The mixture was filtered and the solid was well extracted with diethyl ether. The combined ether solutions were well extracted with dilute hydrochloric acid and water. The combined aqueous acid solutions were washed with diethyl ether and then were basified with sodium hydroxide. The resulting mixture containing oily material was well extracted with diethyl ether. The combined extracts were washed with water and saturated sodium chloride solution, and dried over anhydrous sodium sulfate. After filtration and evaporation of the solvent, 7.7 gm. of crude oily 1,1-bis(3-chlorophenyl)-2-methyl-3-aminopropanol was obtained. The oil was dissolved in 400 ml. of anhydrous diethyl ether. The solution was acidified with methanolic hydrogen chloride and evaporated to dryness in vacuo. The residue was crystallized from 125 ml. of methyl ethyl ketone to provide 3.1 gm. of 1,1 - bis(3-chlorophenyl) - 2 - methyl - 3 - aminopropanol hydrochloride as white crystals having a melting point of 203.5 to 204.5° C. (dec.).

*Analysis.*—Calcd. for $C_{16}H_{18}Cl_3NO$: C, 55.43; H, 5.23; Cl, 30.68; N, 4.04. Found: C, 55.06; H, 5.44; Cl, 30.32; N, 4.09.

Purified 1,1 - bis(3-chlorophenyl) - 2 - methyl-3-aminopropanol can be obtained by basifying the above hydrochloride with aqueous sodium hydroxide solution, extracting the resulting free base with ether, washing the extracts with water, and evaporating the ether.

PREPARATION 4

*1,1-bis(4-methylphenyl)-2-methyl-3-aminopropanol*

A mixture of 32 gm. (0.5 mole) of 85% potassium hydroxide pellets and 500 ml. of xylene was refluxed with vigorous stirring for 2 days, at which time no more water was being collected. Most of the xylene was removed by distillation and replaced with 200 ml. of anhydrous diethyl ether. 33.2 ml. (0.6 mole) of propionitrile was added, followed by a solution of 21.0 gm. (0.1 mole) of 4,4'-dimethylbenzophenone in 200 ml. of anhydrous diethyl ether. The mixture was refluxed for 4 hours and poured into ice water. The resulting layers were separated. The aqueous layer was extracted with diethyl ether and the combined extract and original ether solution was washed successively with water, dilute hydrochloric acid, water, and saturated sodium chloride solution, and dried over anhydrous sodium sulfate. After filtration, the ether was evaporated in vacuo, giving 25.3 gm. of crude 1,1-bis (4-methylphenyl - 2 - cyanopropanol as a yellow syrup.

The syrup was dissolved in 100 ml. of anhydrous diethyl ether and the solution was slowly added with stirring to 11.8 gm. (0.3 mole) of lithium aluminum hydride in 150 ml. of anhydrous diethyl ether. After refluxing the mixture for 24 hours, there was added with vigorous stirring 12.4 ml. of water followed by 1.86 gm. of sodium hydroxide in 52 ml. of water. The mixture was filtered and the solid was well extracted with diethyl ether. The ether solutions were combined and extracted with dilute hydrochloric acid. An oily layer of 1,1 - bis(4-methylphenyl) - 2 - methyl - 3 - aminopropanol hydrochloride remained insoluble in both layers. The aqueous layer and oily hydrochloride were washed with diethyl ether and basified with sodium hydroxide to provide a white solid. The white solid was collected, washed with water, and dried, to provide 17.6 gm. of crude 1,1 - bis(4-methylphenyl) - 2 - methyl - 3 - aminopropanol. This compound, after recrystallization first from isopropyl alcohol and then from methylcyclohexane, had a melting point of 137 to 138.5° C.

*Analysis.*—Calcd. for $C_{18}H_{23}NO$: C, 80.25; H, 8.61; N, 5.20. Found: C, 80.33; H, 8.50; N, 5.26.

The following examples illustrate the best mode contemplated by the inventor for carrying out the invention but are not to be construed as limiting the scope thereof.

EXAMPLE 1

*1,1-diphenyl-2-methyl-3-(benzylideneamino)propanol*

A solution of 48.2 gm. (0.2 mole) of 1,1-diphenyl-2-methyl - 3 - aminopropanol and 26.5 gm. (0.25 mole) of benzaldehyde in 200 ml. of benzene was refluxed using a Dean-Stark trap for 45 min. (by which time the theoretical amount of water had separated). The solution was evaporated to dryness in vacuo below 50° C., giving a crystalline residue. The crystalline residue was recrystallized from 2-propanol, providing 89.5% of the theoretical yield of 1,1-diphenyl - 2 - methyl - 3 - (benzylideneamino)propanol as white needles having a melting point of 132–136° C. I.R., U.V., and N.M.R. spectra supported the structure.

*Analysis.*—Calcd. for $C_{23}H_{23}NO$: C, 83.85; H, 7.04; N, 4.25. Found: C, 83.81; H, 6.93; N, 4.41.

EXAMPLE 2

Following the procedure of Example 1, substituting each of the following substituted benzaldehydes:

3-methylbenzaldehyde,
2-chlorobenzaldehyde,
4-fluorobenzaldehyde,
3-bromobenzaldehyde,
4-methoxybenzaldehyde,
3,4-dimethoxybenzaldehyde,
2,4-dichlorobenzaldehyde,
4-iodobenzaldehyde,
2-ethylbenzaldehyde,
2,4,6-trimethylbenzaldehyde,
3-methyl-4-ethoxybenzaldehyde,
3,5-dimethyl-4-methoxybenzaldehyde,
3-methoxy-4-bromobenzaldehyde,
2-methyl-4-chlorobenzaldehyde,
3,4,5-trimethoxybenzaldehyde,
3-butoxybenzaldehyde, 2,4-diisopropylbenzaldehyde,
3,5-difluorobenzaldehyde,
2-chloro-6-fluorobenzaldehyde, and 2,4,5-trichlorobenzaldehyde, for the benzaldehyde of the example, there can be respectively obtained:

1,1-diphenyl-2-methyl-3-(3-methylbenzylideneamino)propanol,
1,1-diphenyl-2-methyl-3-(2-chlorobenzylideneamino)propanol,
1,1-diphenyl-2-methyl-3-(4-fluorobenzylideneamino)propanol,
1,1,-diphenyl-2-methyl-3-(3-bromobenzylideneamino)propanol,
1,1-diphenyl-2-methyl-3-(4-methoxybenzylideneamino)propanol,
1,1-diphenyl-2-methyl-3-(3,4-dimethoxybenzylideneamino)propanol,
1,1-diphenyl-2-methyl-3-(2,4-dichlorobenzylideneamino)propanol,
1,1-diphenyl-2-methyl-3-(4-iodobenzylideneamino)propanol,
1,1-diphenyl-2-methyl-3-(2-ethylbenzylideneamino)propanol,
1,1-diphenyl-2-methyl-3-(2,4,6-trimethylbenzylideneamino)propanol,
1,1-diphenyl-2-methyl-3-(3-methyl-4-ethoxybenzylideneamino)propanol,
1,1-diphenyl-2-methyl-3-(3,5-dimethyl-4-methoxybenzylideneamino)propanol,
1,1-diphenyl-2-methyl-3-(3-methoxy-4-bromobenzylideneamino)propanol,
1,1-diphenyl-2-methyl-3-(2-methyl-4-chlorobenzylideneamino)propanol,
1,1-diphenyl-2-methyl-3-(3,4,5-trimethoxybenzylideneamino)propanol,
1,1-diphenyl-2-methyl-3-(3-butoxybenzylideneamino)propanol,
1,1-diphenyl-2-methyl-3-(2,4-diisopropylbenzylideneamino)propanol,
1,1-diphenyl-2-methyl-3-(3,5-difluorobenzylideneamino)propanol,
1,1-diphenyl-2-methyl-3-(2-chloro-6-fluorobenzylideneamino)propanol, and
1,1-diphenyl-2-methyl-3-(2,4,5-trichlorobenzylideneamino)propanol.

EXAMPLE 3

Following the procedure of Example 1, substituting each of the following:

1,1-bis(3-chlorophenyl)-2-methyl-3-aminopropanol,
1,1-bis(4-methylphenyl)-2-methyl-3-aminopropanol,
1,1-bis(2-bromophenyl)-2-methyl-3-aminopropanol,
1,1-bis(3-bromophenyl)-2-methyl-3-aminopropanol,
1-phenyl-1-(2-chlorophenyl)-2-methyl-3-aminopropanol,
1,1-bis(4-chlorophenyl)-2-methyl-3-aminopropanol,
1,1-bis(2-iodophenyl)-2-methyl-3-aminopropanol,
1-phenyl-1-(4-fluorophenyl)-2-methyl-3-aminopropanol,
1-phenyl-1-(3-iodophenyl)-2-methyl-3-aminopropanol,
1-phenyl-1-(2-methylphenyl)-2-methyl-3-aminopropanol,
1-phenyl-1-(3-bromo-4-methylphenyl)-2-methyl-3-aminopropanol,
1-(2-bromophenyl)-1-(4-methylphenyl-2-methyl-3-aminopropanol,
1-(4-bromophenyl)-1-(4-ethoxyphenyl)-2-methyl-3-aminopropanol,
1-(2-methoxy-5-methylphenyl)-1-(2-bromophenyl)-2-methyl-3-aminopropanol,
1-phenyl-1-(4-propylphenyl)-2-methyl-3-aminopropanol,
1-phenyl-1-(2,4,5-trimethylphenyl)-2-methyl-3-aminopropanol,
1,1-bis(4-methoxyphenyl)-2-methyl-3-aminopropanol,
1-phenyl-1-(4-propoxyphenyl)-2-methyl-3-aminopropanol,
1-phenyl-1-(2,4,5-trimethoxyphenyl)-2-methyl-3-aminopropanol,
1,1-bis(2,4-dimethoxyphenyl)-2-methyl-3-aminopropanol,
1,1-bis(3,4-dimethoxyphenyl)-2-methyl-3-aminopropanol,
1,1-bis(2,4,5-trimethoxyphenyl)-2-methyl-3-aminopropanol,
1-(2,4,6-trimethoxyphenyl)-1-(3,4,5-trimethoxyphenyl)-2-methyl-3-aminopropanol,
1-phenyl-1-(3-fluorophenyl)-2-methyl-3-aminopropanol,
1,1-bis(4-fluorophenyl)-2-methyl-3-aminopropanol, and
1,1-bis(3-fluorophenyl)-2-methyl-3-aminopropanol for the 1,1-diphenyl-2-methyl-3-aminopropanol of the example,
there can be respectively obtained:

1,1-bis(3-chlorophenyl)-2-methyl-3-(benzylideneamino)propanol,
1,1-bis(4-methylphenyl)-2-methyl-3-(benzylideneamino)propanol,
1,1-bis(2-bromophenyl)-2-methyl-3-(benzylideneamino)propanol,
1,1-bis(3-bromophenyl)-2-methyl-3-(benzylideneamino)propanol,
1-phenyl-1-(2-chlorophenyl)-2-methyl-3-(benzylideneamino)propanol,
1,1-bis(4-chlorophenyl)-2-methyl-3-(benzylideneamino)propanol,
1,1-bis(2-iodophenyl)-2-methyl-3-(benzylideneamino)propanol,
1-phenyl-1-(4-fluorophenyl)-2-methyl-3-(benzylideneamino)propanol,
1-phenyl-1-(3-iodophenyl)-2-methyl-3-(benzylideneamino)propanol,
1-phenyl-1-(2-methylphenyl)-2-methyl-3-(benzylideneamino)propanol,
1-phenyl-1-(3-bromo-4-methylphenyl)-2-methyl-3-(benzylideneamino)propanol,
1-(2-bromophenyl)-1-(4-methylphenyl)-2-methyl-3-(benzylideneamino)propanol,
1-(4-bromophenyl)-1-(4-ethoxyphenyl)-2-methyl-3-(benzylideneamino)propanol,
1-(2-methoxy-5-methylphenyl)-1-(2-bromophenyl)-2-methyl-3-(benzylideneamino)propanol,
1-phenyl-1-(4-propylphenyl)-2-methyl-3-(benzylideneamino)propanol,
1-phenyl-1-(2,4,5-trimethylphenyl)-2-methyl-3-(benzylideneamino)propanol,
1,1-bis(4-methoxyphenyl)-2-methyl-3-(benzylideneamino)propanol,
1-phenyl-1-(4-propoxyphenyl)-2-methyl-3-(benzylideneamino)propanol,
1,1-bis(2,4-dimethoxyphenyl)-2-methyl-3-(benzylideneamino)propanol,
1,1-bis(3,4-dimethoxyphenyl)-2-methyl-3-(benylideneamino)propanol,
1,1-bis(2,4,5-trimethoxyphenyl)-2-methyl-3-(benzylideneamino)propanol,
1-(2,4,6-trimethoxyphenyl)-1-(3,4,5-trimethoxyphenyl)-2-methyl-3-(benzylideneamino)propanol,
1-phenyl-1-(3-fluorophenyl)-2-methyl-3-(benzylideneamino)propanol,
1,1-bis(4-fluorophenyl)-2-methyl-3-(benzylideneamino)propanol, and
1,1-bis(3-fluorophenyl)-2-methyl-3-(benzylideneamino)propanol.

EXAMPLE 4

Following the procedure of Example 1, substituting 1,1-bis(4-methylphenyl)-2-methyl-3-aminopropanol for 1,1 - diphenyl - 2-methyl-3-aminopropanol and 2-chloro-6- fluorobenzaldehyde for benzaldehyde, 1,1-bis(4-methylphenyl) - 2-methyl-3-(2-chloro-6-fluorobenzylideneamino) propanol can be obtained.

What is claimed is:

1. A compound of the formula

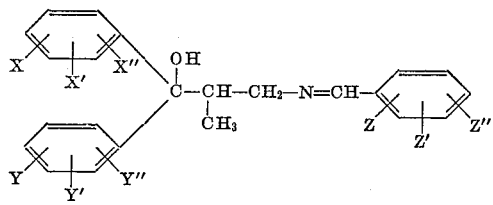

wherein X, X', X", Y, Y', Y", Z, Z', and Z" are members selected from the group consisting of hydrogen; alkyl containing from 1 to 4 carbon atoms, inclusive; alkoxy containing from 1 to 4 carbon atoms, inclusive; and halogen.

2. A compound of claim 1, wherein each of X, X', X", Y, Y', Y", Z, Z', and Z" is hydrogen, and the compound is 1,1-diphenyl-2-methyl-3-(benzylideneamino)propanol.

References Cited

FOREIGN PATENTS 811,659  4/1959  Great Britain.

CHARLES B. PARKER, *Primary Examiner.*

R. V. HINES, *Assistant Examiner.*